(12) United States Patent
Xu et al.

(10) Patent No.: US 11,663,920 B2
(45) Date of Patent: May 30, 2023

(54) METHOD AND DEVICE OF PATH OPTIMIZATION FOR UAV, AND STORAGE MEDIUM THEREOF

(71) Applicant: Beijing University of Posts and Telecommunications, Beijing (CN)

(72) Inventors: Wenjun Xu, Beijing (CN); Chang Deng, Beijing (CN); Ping Zhang, Beijing (CN); Zhi Zhang, Beijing (CN); Hui Gao, Beijing (CN); Zhiyong Feng, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 518 days.

(21) Appl. No.: 17/023,813

(22) Filed: Sep. 17, 2020

(65) Prior Publication Data

US 2021/0003412 A1 Jan. 7, 2021

Related U.S. Application Data

(63) Continuation of application No. PCT/CN2019/124036, filed on Dec. 9, 2019.

(30) Foreign Application Priority Data

Jan. 16, 2019 (CN) .................. CN201910041506

(51) Int. Cl.
*G08G 5/00* (2006.01)
*G06N 20/10* (2019.01)
(Continued)

(52) U.S. Cl.
CPC ......... *G08G 5/0013* (2013.01); *B64C 39/024* (2013.01); *G01C 21/3469* (2013.01);
(Continued)

(58) Field of Classification Search
CPC .............. G08G 5/0013; G08G 5/0034; G08G 5/0069; B64C 39/024; G01C 21/3469;
(Continued)

(56) References Cited

U.S. PATENT DOCUMENTS

| | | |
|---|---|---|
| 2016/0055605 A1 | 2/2016 | Kim et al. |
| 2016/0189545 A1 | 6/2016 | York et al. |
| 2016/0300494 A1 | 10/2016 | Trent et al. |
| 2017/0126309 A1 | 5/2017 | Rupasinghe et al. |

FOREIGN PATENT DOCUMENTS

| | | |
|---|---|---|
| CN | 107017940 A | 8/2017 |
| CN | 107450587 A | 12/2017 |

(Continued)

OTHER PUBLICATIONS

First Office Action issued in counterpart Chinese Patent Application No. 201910041506.X, dated Aug. 19, 2019.
Fu et al., Path planning and communication optimizing in multi-UAVs cooperative communication relay, Systems Engineering and Electronics, vol. 36, No. 5, pp. 890-894, dated May 31, 2014.
(Continued)

*Primary Examiner* — Alan D Hutchinson
(74) *Attorney, Agent, or Firm* — Westbridge IP LLC

(57) ABSTRACT

Disclosed is a method of path optimization for an unmanned aerial vehicle (UAV). In the method, users and the positions of the users are obtained; the users are divided into K wireless multicast user groups; K initial hovering positions corresponding to the K wireless multicast user groups are determined; and a first shortest flying path connecting the K initial hovering positions is determined; and the initial hovering positions of the UAV are optimized to obtain K final hovering positions and a final flying path. The present disclosure also discloses a device of path optimization for a UAV and a computer readable storage medium.

16 Claims, 7 Drawing Sheets

(51) Int. Cl.
*B64C 39/02* (2023.01)
*G01C 21/34* (2006.01)
*H04L 12/18* (2006.01)
*G06F 18/23213* (2023.01)

(52) U.S. Cl.
CPC ....... *G06F 18/23213* (2023.01); *G06N 20/10* (2019.01); *G08G 5/0034* (2013.01); *G08G 5/0069* (2013.01); *H04L 12/185* (2013.01); *B64U 2201/20* (2023.01)

(58) Field of Classification Search
CPC .............. G01C 21/20; G06F 18/23213; G06N 20/10; G06N 5/01; G06N 3/006; G06N 3/08; H04L 12/185; B64U 2201/20; B64U 2101/20; B64U 2201/00; H04W 4/90; H04W 4/02; H04W 4/06; H04W 4/08; Y02D 30/70; G06Q 10/047
See application file for complete search history.

(56) References Cited

FOREIGN PATENT DOCUMENTS

| | | |
|---|---|---|
| CN | 108521667 A | 9/2018 |
| CN | 108616303 A | 10/2018 |
| CN | 108832998 A | 11/2018 |
| CN | 108834049 A | 11/2018 |
| CN | 108848465 A | 11/2018 |
| CN | 108924791 A | 11/2018 |
| CN | 109213712 A | 1/2019 |
| CN | 109682380 A | 4/2019 |

OTHER PUBLICATIONS

Fu et al., Sectional Optimization Routing Algorithm Based on Geographic Location in UAV Network, Computers and Modernization, No. 9, 2018, pp. 87-92, dated Dec. 31, 2018.

International Search Report and Written Opinion issued in corresponding PCT Application No. PCT/CN2019/124036, dated Mar. 10, 2020.

METHOD AND DEVICE OF PATH OPTIMIZATION FOR UAV, AND STORAGE MEDIUM THEREOF

CROSS-REFERENCE TO RELATED APPLICATIONS

The present application is a continuation of PCT application PCT/CN2019/124036 entitled "Method and Device of Path Optimization for UAV, and Storage Medium thereof" filed on Dec. 9, 2019, which claims priority of Chinese patent application 201910041506.X, filed on Jan. 16, 2019, the entire contents of which are incorporated herein by reference.

TECHNICAL FIELD

The present disclosure relates to unmanned aerial vehicle (UAV) communication technology, in particular to a method and a device of path optimization for a UAV in a UAV communication system, and a storage medium thereof.

BACKGROUND

UAVs now have been widely used in industries due to their advantages such as low costs, great flexibility, being easy and quick to deploy, having small channel attenuations and so on. Therefore, UAV communication systems has now become an essential part of wireless communications. However, UAV communication systems are not perfect and facing many challenges. Among these challenges, the shortage of energy of a UAV is one of its most restrictive factors.

Those skilled in the art would also know that, wireless multicast has become a mature technology for multimedia transmission, which can improve the spectrum utilization effectively. However, conventional wireless multicast techniques also face a very challenging problem. That is, the multicast transmission rate of a multicast group would be limited by a user with the worst channel condition in the multicast group.

With respect to the problems of wireless multicast technology, also the advantages and challenges of UAV communication systems, that utilizing a UAV communication system to implement wireless multicast has become one of research focuses. On one hand, by utilizing a UAV communication system to implement wireless multicast, the problem of limited multicast transmission rate can be solved by the excellent performance of the UAV communication system on many aspects, such as low costs, great flexibility, being easy and quick to deploy, having small channel attenuations and so on. On the other hand, by utilizing a UAV communication system to implement wireless multicast, the advantages of multicast, that is, the advantages of transmitting same data to a plurality of users at the same time would be utilized to decrease the time and energy consumed by a UAV to complete a transmission task in the UAV communication system.

SUMMARY

In view of the foregoing description, the present disclosure provides a method of path optimization for a UAV. According to this method, hovering positions and a flying path of a UAV in a UAV communication system can be determined and optimized, therefore, the energy consumption of the UAV may be reduced.

According to some examples of the present disclosure, the method of path optimization for a UAV may include the following steps: determining the number of wireless multicast user groups according to the number of users, the position of each user and the size of one or more files to be transmitted; dividing the users into a plurality of wireless multicast user groups according to the number of the wireless multicast user groups determined; determining a hovering position of the UAV corresponding to each wireless multicast user group; determining a first shortest flying path connecting all hovering positions of the UAV; determining a first total energy consumption of the UAV according to the size of the one or more files to be transmitted, the hovering positions of the UAV and the first shortest flying path of the UAV; optimizing the hovering positions of the UAV one by one to obtain a plurality of optimized hovering positions; determining a second shortest flying path connecting the plurality of optimized hovering positions; determining a second total energy consumption of the UAV according to the size of the one or more files to be transmitted, the optimized hovering positions of the UAV and the second shortest flying path; comparing the first total energy consumption with the second total energy consumption; on condition that the absolute value of the difference between the first total energy consumption and the second total energy consumption is larger than a preset threshold, returning to the step of optimizing the hovering positions of the UAV one by one to carry out a next round of optimization; and on condition that the absolute value of the difference is less than or equal to the preset threshold, determining the optimized hovering positions as the hovering positions of the UAV and determining the second shortest flying path as the flying path of the UAV.

According to some examples of the present disclosure, a device of path optimization for a UAV is also provided which includes: at least one processor; and a memory coupled with the at least one processor; wherein, the memory stores one or more instructions executable by the at least one processor to enable the at least one processor to perform the above method of path optimization for a UAV.

According to some examples of the present disclosure, a non-transitory computer-readable storage medium is also provided which includes one or more instructions, when executed by one or more processors, enables the one or more processors to perform the above method of path optimization for a UAV.

According to some examples of the present disclosure, the users may be divided into a plurality of wireless multicast user groups based on the number and the geographic distribution of the users. Then an appropriate hovering position can be found in each wireless multicast user group. So that the UAV can transmit data at a hovering position with a higher transmission rate. By this scheme, not only the hovering energy consumption of the UAV but also the communication energy consumption of the UAV caused by data transmission can be greatly reduced. Furthermore, according to some examples of the present disclosure, a shortest flying path of the UAV which both starts and ends at the start position of the UAV and passes through all hovering positions can be found. In these examples, the flying energy consumption of the UAV can also be reduced. It can be seen that, in the examples of the present disclosure, both mechanical energy consumption and communication energy consumption of a UAV are considered, therefore, the multicast service transmission task can be completed with a minimum total energy consumption.

BRIEF DESCRIPTION OF DRAWINGS

In order to illustrate the examples of the present disclosure more clearly, reference will now be made to the accompanying drawings, which are incorporated in and constitute a part of this specification.

DETAILED DESCRIPTION OF THE EMBODIMENTS

As mentioned above, utilizing a UAV communication system to implement wireless multicast has become one of research focuses. This system can be called as a UAV multicast communication system. At present, most researches on UAV multicast communication systems are focus on how to improve the communication performance between the UAV and the users through the design of the flying path of the UAV. However, conventional flying path designs of a UAV seldom consider the energy consumption when the UAV is performing a transmission task. In this circumstance, communications may be interrupted frequently when the energy of the UAV becomes insufficient in the communication process.

Figure 1:
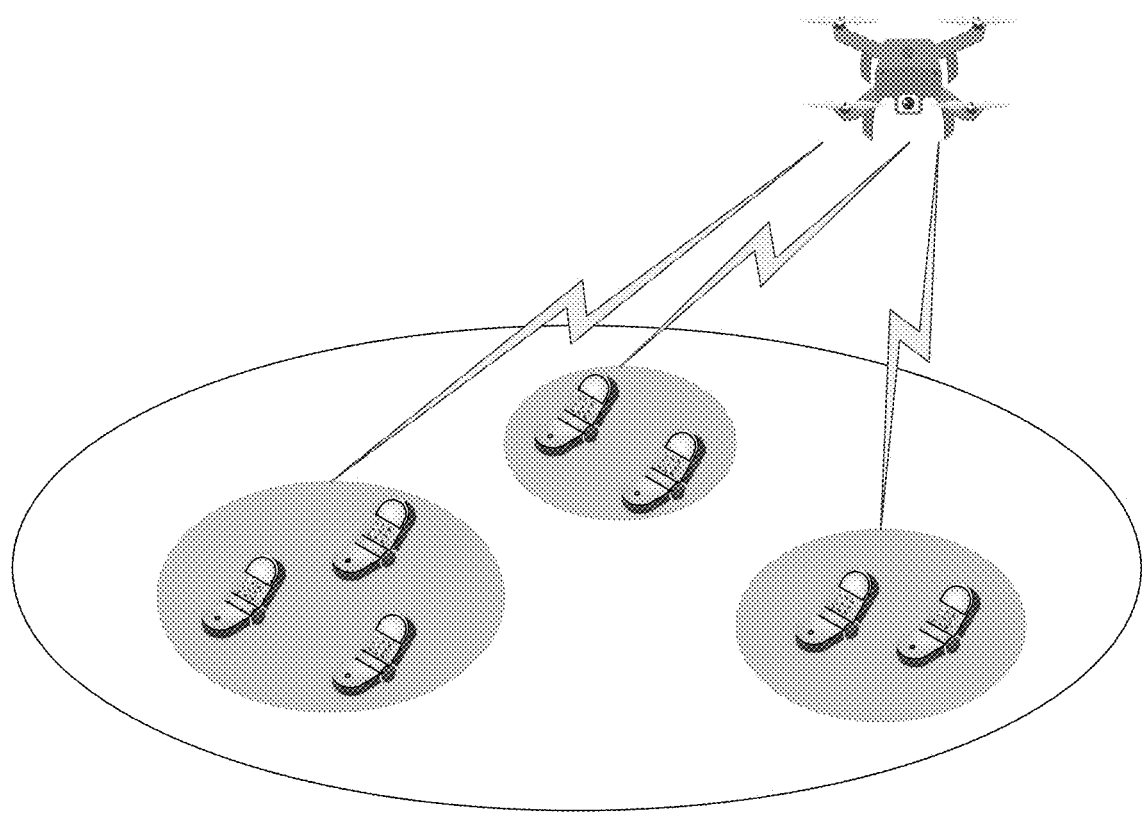
FIG. 1 is a schematic diagram illustrating an implementing scenario of wireless multicast which utilizes a UAV communication system according to some examples of the present disclosure.

FIG. 1 is a schematic diagram illustrating an implementing scenario of wireless multicast which utilizes a UAV communication system according to some examples of the present disclosure. When the communication infrastructure is damaged by a natural disaster or in a remote area where there is no communication infrastructure, one or more UAVs may be used to multicast data to a plurality of wireless multicast users.

As shown in FIG. 1, in this scenario, UAV 1 which is used to perform a wireless multicast task needs to provide a wireless multicast service to a wireless multicast user set 2 which includes a plurality of wireless multicast users 4 (hereinafter called as user for short). According to some examples of the present disclosure, since the multicast transmission rate of the wireless communication depends on the channel condition of the user with the worst channel condition, in order to improve the quality and efficiency of the wireless multicast service, the users 4 in the wireless multicast user set 2 can be further divided into a plurality of wireless multicast user groups 3. UAV 1 would then provide wireless multicast services to each wireless multicast user group 3 one by one.

In order to reduce the energy consumption of the UAV, one or more examples of the present disclosure provide a method of path optimization for a UAV.

Firstly, a plurality of users may be divided into a plurality of wireless multicast user groups. Then, a hovering position may be determined for each wireless multicast user group. Finally, a shortest flying path covering all hovering points of the wireless multicast user groups may be determined, so as to minimize the total energy consumed by the UAV while completing the multicast transmission task.

By the method proposed, the purposes of reducing the total energy consumed by the UAV for completing the multicast transmission task, namely the total energy consumption, and improving the energy utilization efficiency can be achieved.

According to some examples of the present disclosure, the total energy consumption may include mechanical energy consumption and communication energy consumption of a UAV. The mechanical energy consumption may include the amount of energy consumed by the UAV while hovering in any of the hovering positions, namely hovering energy consumption of the UAV; and the amount of energy consumed by the UAV while flying between the hovering positions, namely flying energy consumption of the UAV. The communication energy consumption refers to the amount of energy consumed by the UAV for data transmission.

Examples of the present disclosure would be described in detail with reference to the accompanying drawings to facilitate a more complete, accurate and thorough understanding of the concepts and aspects of the present disclosure by those skilled in the art.

Figure 2:
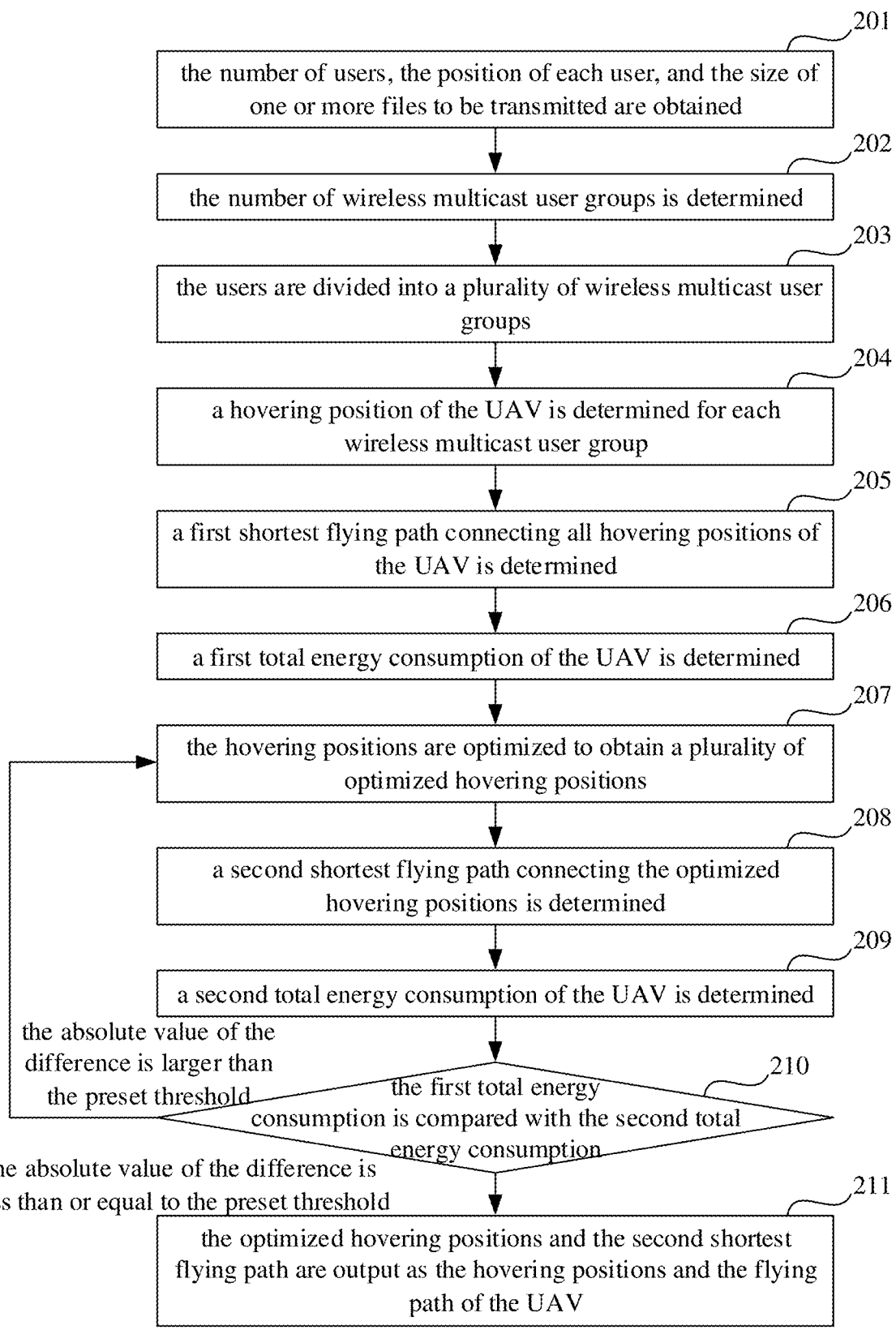
FIG. 2 is a flow chart illustrating a method of path optimization for a UAV according to some examples of the present disclosure.

FIG. 2 is a flow chart illustrating a method of path optimization for a UAV according to some examples of the present disclosure. According to some examples of the present disclosure, the method may be implemented by a computing device in communication with the UAV. As shown in FIG. 2, the method may include the following steps.

In block 201, the number of users, the position of each user, and the size of one or more files, i.e. the amount of data, to be transmitted are obtained.

According to some examples of the present disclosure, the number of users, the position of each user may be determined by a positioning method, such as GPS or the like. In these examples, the position of each user may refer to the geographic position of each user. The size of the one or more files to be transmitted may be determined by the requirements of the transmission task to be completed by the UAV.

In block 202, the number of wireless multicast user groups is determined according to the number of the users, the position of each user and the size of the one or more files to be transmitted.

According to some examples of the present disclosure, the number of the wireless multicast user groups may be determined by a trained Support Vector Machine (SVM) according to the number of the users, the position of each user and the size of the one or more files to be transmitted.

According to some other examples of the present disclosure, the number of the wireless multicast user groups may be determined by a trained neural network according to the number of the users, the position of each user and the size of the one or more files to be transmitted.

In block 203, the users are divided into a plurality of wireless multicast user groups according to the number of the wireless multicast user groups determined.

According to some examples of the present disclosure, the users may be divided into multiple wireless multicast user groups by the k-means algorithm or any of other clustering algorithms.

In block 204, a hovering position of the UAV is determined for each wireless multicast user group.

According to some examples of the present disclosure, the hovering position corresponding to a multiple ineffective multicast user group may be determined by the minimum circle coverage method.

In block 205, a first shortest flying path connecting all hovering positions of the UAV is determined.

According to some examples of the present disclosure, the first shortest flying path may be determined by any one of the following methods: the genetic algorithm, the particle swarm algorithm, the ant colony algorithm, the simulated annealing algorithm or the neural network algorithm.

In block 206, a first total energy consumption of the UAV is determined according to the size of the one or more file to be transmitted, the hovering positions and the first shortest flying path of the UAV.

According to some examples of the present disclosure, the communication energy consumption and the hovering energy consumption of the UAV may be determined according to the size of the one or more files to be transmitted and the hovering positions of the UAV. Specifically, the time required for transmitting the one or more files and the transmitting power of the UAV can be determined according to the size of the one or more files to be transmitted and the hovering positions. Therefore, the communication energy consumption and the hovering energy consumption of the UAV can be determined according to the time required for transmitting the one or more files and the transmitting power of the UAV.

According to some examples of the present disclosure, the flying energy consumption of the UAV may be determined according to the first shortest flying path determined.

Then the first total energy consumption of the UAV may be determined according to the communication energy consumption, the hovering energy consumption and the flying energy consumption determined.

In block 207, the hovering positions are optimized to obtain a plurality of optimized hovering positions.

According to some other examples of the present disclosure, the hovering positions may be optimized one by one using the interior point method or other non-linear programming solutions.

In block 208, a second shortest flying path connecting the optimized hovering positions is determined.

According to some other examples of the present disclosure, as stated in block 205, the second shortest flying path may be determined by any one of the following methods: the genetic algorithm, the particle swarm algorithm, the ant colony algorithm, the simulated annealing algorithm and the neural network algorithm.

In block 209, a second total energy consumption of the UAV is determined according to the size of the one or more files to be transmitted, the optimized hovering positions and the second shortest flying path.

According to some examples of the present disclosure, the communication energy consumption and the hovering energy consumption of the UAV may be determined according to the size of the file to be transmitted and the optimized hovering positions. Specifically, the time required for transmitting the one or more files and the transmitting power of the UAV can be determined according to the size of the one or more files to be transmitted and the optimized hovering positions. Therefore, the communication energy consumption and the hovering energy consumption of the UAV can be determined according to the time required for transmitting the one or more files and the transmitting power of the UAV.

According to some examples of the present disclosure, the flying energy consumption of the UAV may be determined according to the second shortest flying path determined.

Then the second total energy consumption of the UAV may be determined according to the communication energy consumption, the hovering energy consumption and the flying energy consumption determined.

In block 210, the first total energy consumption is compared with the second total energy consumption.

On condition that the absolute value of the difference between the first total energy consumption and the second total energy consumption is larger than a preset threshold, return to block 207 to carry out a next round optimization. Before returning to block 207, the optimized hovering positions are taken as the hovering positions in block 207 (that is, the hovering positions before being optimized) and the second total energy consumption is taken as the first total energy consumption.

On condition that the absolute value of the difference is less than or equal to the preset threshold, proceed to block 211.

According to some examples of the present disclosure, on condition that the absolute value of the difference is larger than the preset threshold, the second total energy consumption may be set as the first total energy consumption before returning to block 207.

In block 211, the optimized hovering positions and the second shortest flying path are output as the hovering positions and the flying path of the UAV.

Figure 3:
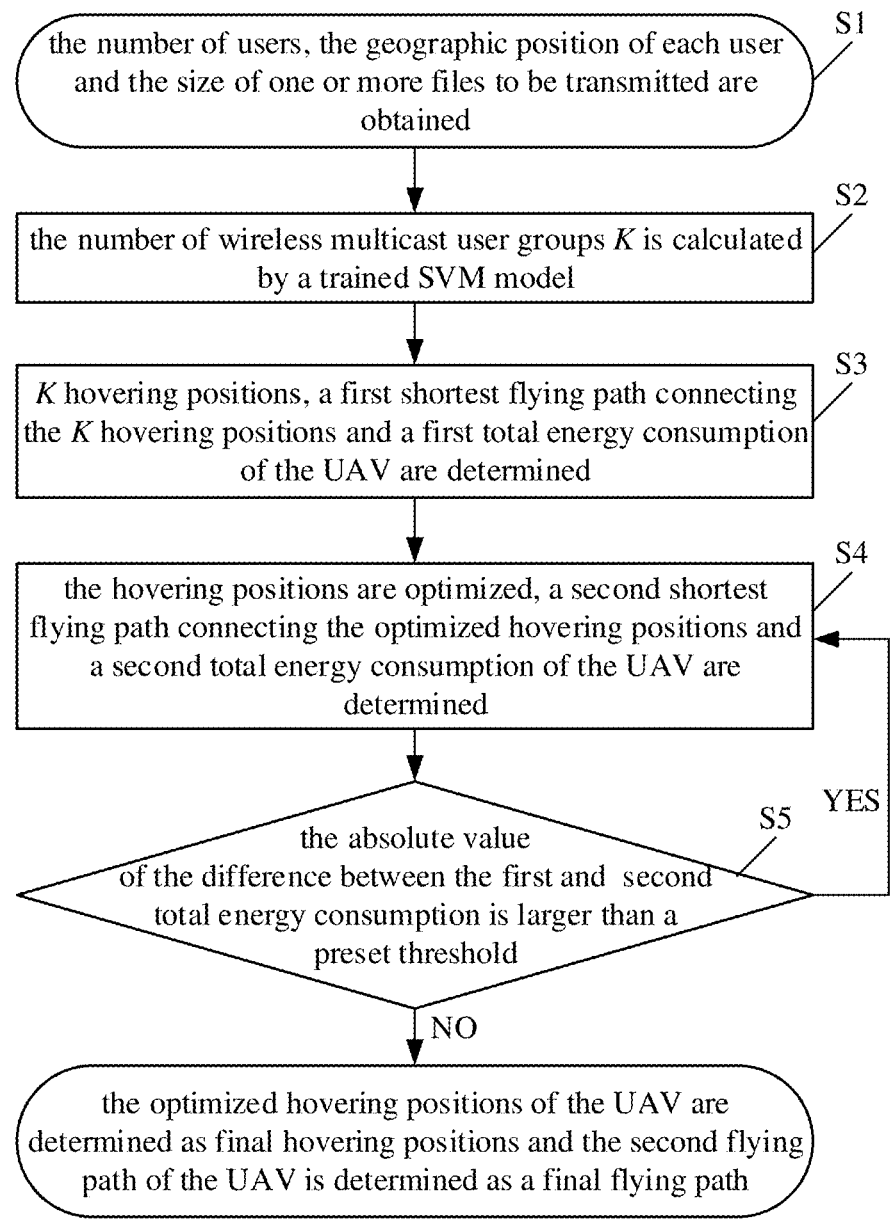
FIG. 3 is a flow chart illustrating a method of path optimization for a UAV according to some other examples of the present disclosure.

FIG. 3 is a flow chart illustrating a method of path optimization for a UAV according to some examples of the present disclosure. As shown in FIG. 3, the hovering positions and the flying path of the UAV may be determined through the following steps.

In block S1, the number of users N, the geographic position of each user $W_n$ and the size of one or more files to be transmitted S are obtained.

In block S2, the number of wireless multicast user groups K is calculated by a trained SVM model according to the number of users N, the geographic position of each user $W_n$ and the size of the one or more files to be transmitted S. Moreover, the users are divided into K wireless multicast user groups through the k-means algorism.

In block S3, K hovering positions are determined through the minimum circle coverage method. Wherein, each of the K hovering positions corresponds to one wireless multicast user group respectively. Then, a first shortest flying path connecting the K hovering positions is determined through the genetic algorithm. The communication energy consumption and the hovering energy consumption of the UAV are determined according to the size of the one or more files S and the hovering positions $W_n$ of the UAV. The flying energy consumption is determined according to the first shortest flying path. Finally, a first total energy consumption of the UAV is determined according to the communication energy consumption, the hovering energy consumption and the flying energy consumption determined.

In block S4, the hovering positions are optimized one by one through the interior point method to obtain multiple optimized hovering positions. Then, a second shortest flying path connecting the optimized hovering positions is determined through the genetic algorithm. Moreover, a second total energy consumption of the UAV is determined according to the optimized hovering positions and the second shortest flying path.

In block S5, the first total energy consumption and the second total energy consumption are compared. On condition that the absolute value of the difference between the first total energy consumption and the second total energy consumption is larger than a preset threshold, return to block S4 to carry out a next round of optimization on the basis of the current optimization result. On condition that the absolute value of the difference is less than or equal to the preset threshold, the optimized hovering positions of the UAV may be determined as final hovering positions and the second flying path of the UAV may be determined as a final flying path.

As stated above, the multicast transmission rate of the UAV depends on the channel condition of the user with the worst channel condition, and the channel condition of the user mainly depends on the distance between the user and the UAV. Therefore, in order to enhance the multicast transmission rate of the UAV, as well as, reduce the transmission time and the energy consumption of the UAV, the following method is proposed.

Specifically, as illustrated in FIG. 1, FIG. 2 and FIG. 3, after the positions of the users are obtained, the optimized number of wireless multicast user groups K is first determined. Then, the wireless multicast user set 2 is divided into K wireless multicast user groups. Further, an initial hovering position of the UAV is determined with respect to each wireless multicast user group. Wherein, while hovering at the initial hovering position, the UAV may transmit one or more files to the users in the wireless multicast user group corresponding to the initial hovering position with a faster transmission rate and a lower communication energy consumption. At the same time, since the transmission rate is faster, it will take less time to transmit the one or more files. Therefore, the time required for the UAV to hover at the initial position is shorter, and thus the hovering energy consumption is reduced. When K initial hovering positions of K wireless multicast user groups are all determined, a shortest flying path of the UAV connecting the K initial hovering positions may then be determined to lower the flying energy consumption of the UAV. Since the total energy consumption of the UAV can be calculated as the sum of the communication energy consumption, the hovering energy consumption and the flying energy consumption. Once the hovering positions and the flying path of the UAV are determined, the total energy consumption of the UAV may be determined. Later, the hovering positions of the UAV may be further optimized and then the flying path of UAV may be further optimized based on the optimized hovering positions of the UAV to further reduce the total energy consumption of the UAV. So repeated, a lowest total energy consumption of the UAV may be obtained, and accordingly the final hovering positions and the final flying path corresponding to the lowest total energy consumption of the UAV may be obtained.

It can be seen that, according to the above method, a plurality of users is adaptively separated into a plurality of wireless multicast user groups. Then an appropriate hovering position is found for each wireless multicast user group. Further, a shortest flying path connecting all the hovering positions is found. In this method, the total energy consumption of the UAV for completing a multicast transmission task is minimized, therefore, the energy utilization efficiency of the UAV is optimized.

The training method of the SVM model will be described in detail with reference to the accompanying drawings.

Figure 4:
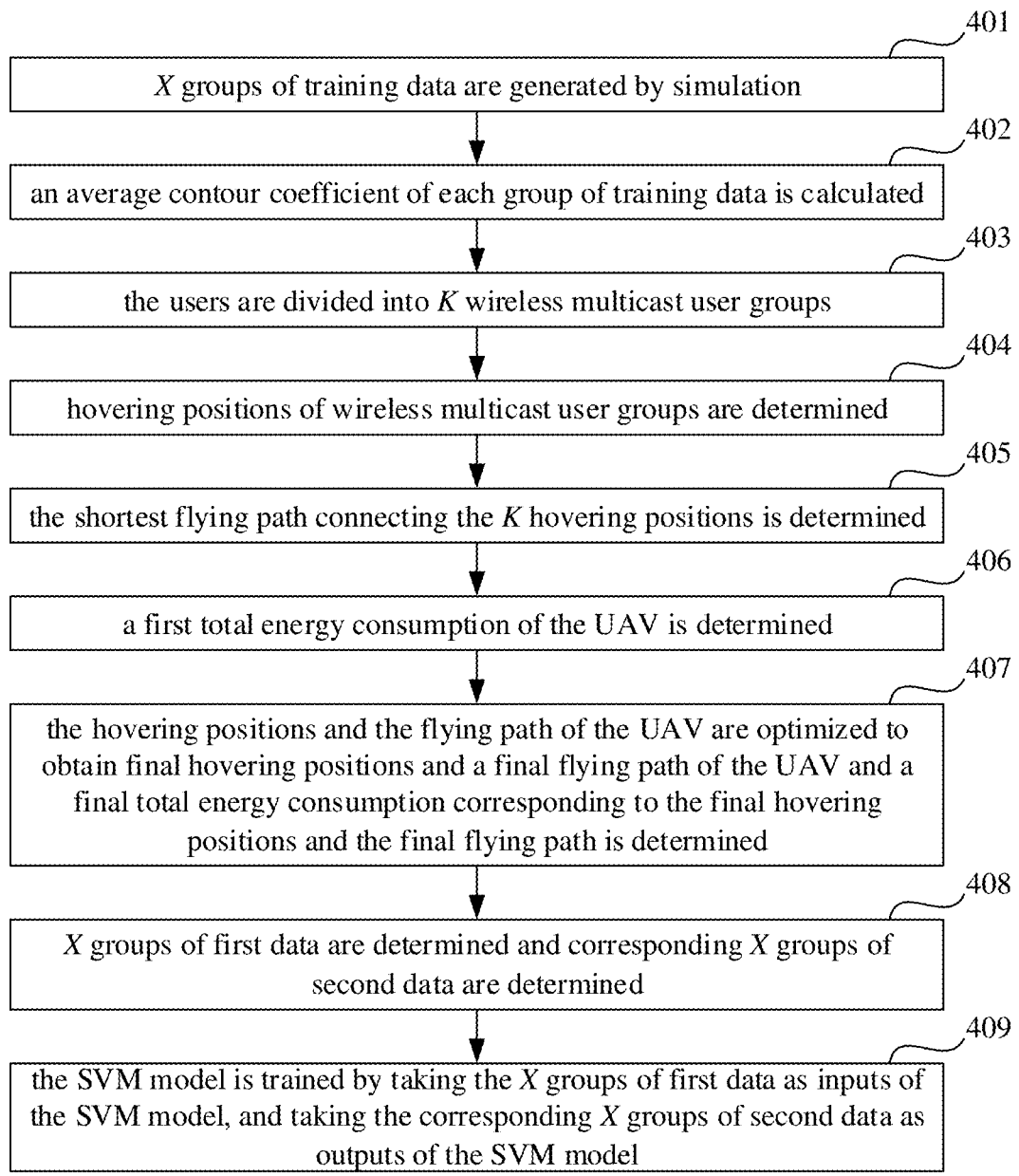
FIG. 4 is a flowchart illustrating a method for training an SVM model according to some examples of the present disclosure.

FIG. 4 is a flowchart illustrating a method for training an SVM model according to some examples of the present disclosure. As shown in FIG. 4, the training method of the SVM model may include the following step.

In block 401, X groups of training data are generated by simulation. Wherein, each group of training data may include: the number of users, the geographic positions of the users, the size of one or more files to be transmitted and the number of wireless multicast user groups K.

In block 402, an average silhouette coefficient of each group of training data is calculated according to the number of users, the geographic positions of the users and the number of wireless multicast user groups K of the group of training data.

In block 403, with respect to each group of training data, the users are divided into K wireless multicast user groups.

In some examples of the present disclosure, the users in each group of training data are separated into K wireless multicast user groups through the k-means algorithm.

In block 404, with respect to each wireless multicast user group, a hovering position of the wireless multicast user group is determined. Therefore, there would be K hovering positions determined in total.

In some examples of the present disclosure, the hovering position of each wireless multicast user group may be determined through the minimum circle coverage method.

In block 405, the shortest flying path connecting the K hovering positions is determined.

In some examples of the present disclosure, the shortest flying path connecting the K hovering positions may be obtained through the genetic algorithm.

In block 406, a first total energy consumption of the UAV is determined according to the size of the one or more files to be transmitted, the hovering positions and the flying path determined above.

In some examples of the present disclosure, firstly, the communication energy consumption and the hovering energy consumption of the UAV may be determined according to the size of the one or more files to be transmitted and the hovering positions determined. Furthermore, the flying energy consumption of the UAV may be determined according to the flying path determined. Finally, the total energy consumption of the UAV may be determined according to the communication energy consumption, the hovering energy consumption and the flying energy consumption. Specifically, the total energy consumption of the UAV may be the sum of the communication energy consumption, the hovering energy consumption and the flying energy consumption.

In block 407, the hovering positions and the flying path of the UAV are optimized to obtain final hovering positions and a final flying path of the UAV. Then, a final total energy consumption corresponding to the final hovering positions and the final flying path is determined.

In block 408, X groups of first data are determined. Wherein, each group of the first data include the number of users, the number of wireless multicast user groups K, the size of the one or more files to be transmitted and the average silhouette coefficient. Furthermore, corresponding X groups of second data are determined. Wherein, each group of the second data include the final total energy consumption corresponding to a group of the first data.

In block 409, the SVM model is trained by taking the X groups of first data as inputs of the SVM model, and taking the corresponding X groups of second data as outputs of the SVM model.

Specifically, according to some examples of the present disclosure, in the training process of the SVM model, the step of optimizing the hovering positions and the flying path in block 407 may include the following steps.

In block 4071, the K hovering positions is optimized one by one through the interior point algorism to obtain K optimized hovering positions. Moreover, the shortest flying path connecting the K optimized hovering positions is obtained through the genetic algorithm to obtain an optimized total energy consumption.

In block 4072, the total energy consumption before optimization and the optimized total energy consumption are compared. On condition that the absolute value of the difference between the total energy consumption before optimization and the optimized total energy consumption is larger than a preset threshold, return to the block 4071 to perform a next round optimization on the basis of the result of the current optimization. On condition that the absolute value of the difference is less than or equal to the preset threshold, the optimized hovering positions and the optimized flying path are taken as the final hovering positions and the final flying path, and the optimized total energy consumption is taken as the final total energy consumption.

In the examples of the present disclosure, the meaning of "on the basis of the current optimization" may refer to taking the optimized total energy consumption as the total energy consumption before the next round of optimization and taking the K optimized hovering positions as K hovering positions before the next round of optimization.

Specifically, in examples of the present disclosure, training data may be obtained by the following method.

In practical applications, the training data may be generated by simulating actual conditions. In order to improve the accuracy of the model, X groups of training data may be generated through simulation, wherein the value of the X should not be lower than 100000. Each group of training data may include attributes such as the number of users, the geographic positions of the users, the size of one or more files to be transmitted and the number of wireless multicast user groups. Then, the average silhouette coefficient for each group of data is calculated. In examples of the present disclosure, the average silhouette coefficient may be used to evaluate the result of k-means clustering. When the number of users, positions of the users and the number of wireless multicast groups are determined, the average silhouette coefficient may be calculated according to the silhouette coefficient of each user. Wherein, the silhouette coefficient of user i can be calculated through the following formula (1).

$$\lambda(i) = \frac{b(i) - a(i)}{\max\{a(i), b(i)\}} \quad (1)$$

Wherein, b(i) represents the average distance from user i to all users in other wireless multicast user groups; a(i) represents the average distance from user i to other users in its own wireless multicast group.

In some examples of the present disclosure, the average silhouette coefficient is the average of the silhouette coefficients of all users. Because the average silhouette coefficient reflects the aggregation degree of a wireless multicast group and also the dispersion degree of different wireless multicast groups, the average silhouette coefficient may indirectly reflect the geographic distribution of the users. The final total energy consumption with respect to each set of training data can be calculated by the method described above.

Then, the data are processed to generate X groups of first data, each of which include the number of users, the number of wireless multicast user groups, the size of one or more files to be transmitted and the average silhouette coefficient. The X groups of first data are taken as inputs of the SVM model. Furthermore, corresponding X groups of second data would be generated. Each group of the second data include the final total energy consumption corresponding to a group of the first data and would be taken as an output of the SVM model. Thus, the SVM model may be trained according to the above inputs and outputs.

When a new scenario is encountered, i.e., the UAV needs to transmit one or more files to a plurality of users, relevant attributes of the scenario may be obtained. The relevant attributes may include the number of users N, the geographic positions of the users $W_n$ and the size of the one or more files to be transmitted S. With respect to different number of wireless multicast user groups $K \in [1, N]$, the average silhouette coefficient may be calculated. After the average silhouette coefficient is input into the SVM model trained before, the total energy consumptions corresponding to different number of wireless multicast user groups $K \in [1, N]$ may be output by the SVM model. Therefore, the number of wireless multicast user groups may be found when the total energy consumption reaches its minimum value.

Figure 5:
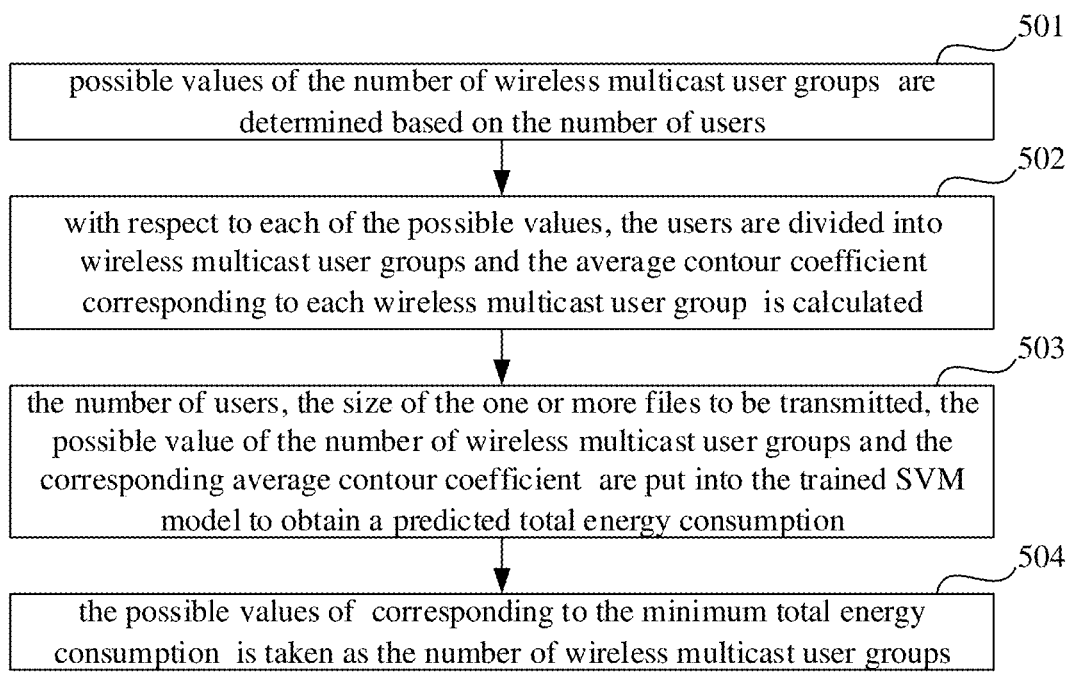
FIG. 5 is a flow chart illustrating a method for calculating the number of wireless multicast user groups according to some examples of the present disclosure.

As an example of the present disclosure, the method for determining the number of wireless multicast user groups can be as shown in FIG. 5, which may include the following steps.

In block 501, possible values of the number of wireless multicast user groups $K^*$ are determined based on the number of users N.

Specifically, according to some examples of the present disclosure, there would be N possible values of the number of wireless multicast user groups. The range of the possible values may be from 1 to N, i.e. $K^* \in [1, N]$.

In block 502, with respect to each of the possible values of the number of each specific wireless multicast user groups $K^*$, the users are divided into $K^*$ wireless multicast user groups through the k-means algorithm and the average silhouette coefficient $\lambda^*$ corresponding to each wireless multicast user group $K^*$ is calculated.

In block 503, the number of users N, the size of the one or more files to be transmitted S, the possible value of the number of wireless multicast user groups $K^*$ and the corresponding average silhouette coefficient $\lambda^*$ are put into the trained SVM model to obtain a predicted total energy consumption $E_K^*$ corresponding to the possible value of the number of the wireless multicast user groups $K^*$.

Since range of the possible values of $K^*$ is from 1 to N, the SVM model can output a predicted total energy consumption $E_K^*$ of the UAV for each possible values of $K^*$.

In block 504: the minimum total energy consumption $E_K^*$ is found from the predicted total energy consumptions. The possible values of $K^*$ corresponding to the minimum total energy consumption $E_K^*$ is then taken as the number of wireless multicast user groups K.

In some examples of the present disclosure, in order to enable the UAV to have a high data transmission rate in each wireless multicast user group, an initial hovering position for transmitting data can be found for each wireless multicast user group. When the UAV flies to this initial hovering position, it would hover at this hovering position and keep transmitting data. According to Shannon's formula, the maximum transmission rate of the UAV in a wireless multicast user group can be represented by the following formula (2).

$$R_k = \min_{n \in N_k} B \log_2\left(1 + \frac{P_t \beta_0}{\sigma^2(\|u_k - w_n\|_2^2 + H^2)}\right) \quad (2)$$

Wherein, $P_t$ represents the transmission power of the UAV; H represents the height of the UAV from the ground; $\sigma^2$ represents the power of the white Gaussian noise; $\beta_0$ represents a channel power gain at a distance of 1 m from the UAV; B represents the bandwidth of multicast transmission of the UAV.

The time $T_K$ that takes the UAV to transmit data in the wireless multicast group can be represented by the following formula (3).

$$T_k = \frac{S}{R_k} \quad (3)$$

Wherein, S represents the size of the one or more files to be transmitted by the UAV.

In this example, the total time that takes the UAV to transmit data in all the wireless multicast user groups may be represented as $$T_t = \sum_{k \in K} T_k.$$

Then the total energy consumption of the UAV to transmit data may be represented as $E_t = P_t T_t$. Without considering the error, the total time while the UAV is hovering at all the hovering positions may equal to the total time that takes the UAV to transmit data, that is, $T_h = T_t$. Then the hovering energy consumption of the UAV may be represented as $E_h = P_h T_h$, wherein, $P_h$ represents the mechanical power of the UAV while hovering. In addition, the UAV should fly to the hovering positions one by one and then return to its start position. Assuming the distance of this fight is D, $$D = \sum_{k=1}^{K} \|u_k - u_{k-1}\|, u_K = u_0,$$

then the total flying time of the UAV may be represented as $$T_f = \frac{D}{V},$$

wherein, V represents the flying speed of the UAV. In order to complete the transmission task faster, assuming that the UAV would fly with its fast flying speed, then the flying energy consumption of the UAV may be represented as $E_f = P_f T_f$, wherein, $P_f$ represents the mechanical power of the UAV while flying.

According to some examples of the present disclosure, in order to minimize the total energy consumption of the UAV while executing a transmission task, it is necessary to find a suitable number of wireless multicast user groups, find a suitable hovering position for each wireless multicast user group and a suitable flying path among the wireless multicast user groups.

Figure 6:
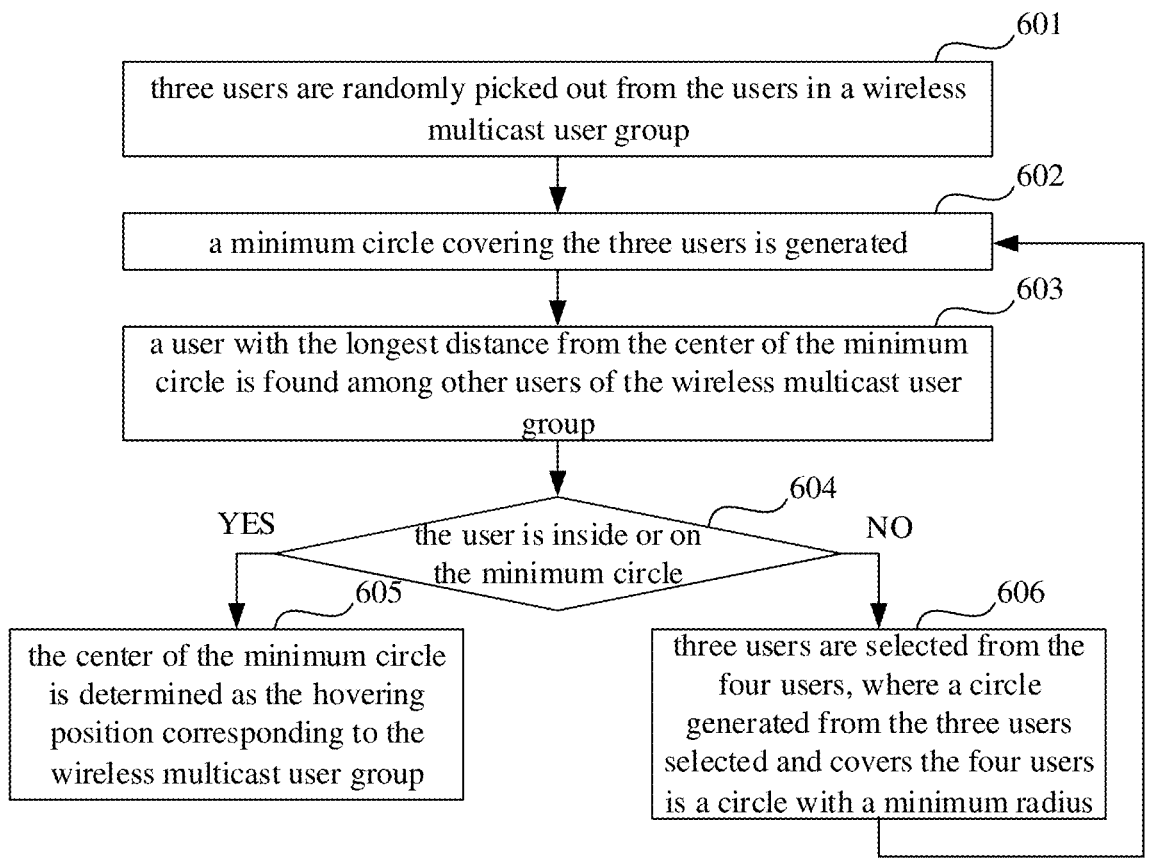
FIG. 6 is a flow chart illustrating a method for determining a hovering position of a UAV through a minimum circle coverage method according to some examples of the present disclosure.

In some examples, the minimum circle coverage algorithm may be adopted to determine the initial hovering positions $u_k$ of the UAV. In the minimum circle coverage algorithm, a circle with a smallest radius that covers all users belonging to a same wireless multicast user group is detected. Then the center of the circle may be taken as the initial hovering position $u_k$ of the wireless multicast user group. As shown in FIG. 6, an initial hovering position of the UAV in one wireless multicast user group may be determined according to the following steps.

In block 601, three users $N_a$, $N_b$, $N_c$ are randomly picked out from the users in a wireless multicast user group.

In block 602, a minimum circle covering the three users $N_a$, $N_b$, $N_c$ is generated.

In block 603, a user $N_d$ with the longest distance from the center of the minimum circle is found among other users of the wireless multicast user group.

In block 604, on condition that the user $N_d$ is inside or on the minimum circle, proceed to block 605; otherwise, proceed to block 606.

In block 605, the center of the minimum circle is determined as the hovering position corresponding to the wireless multicast user group. Then the algorithm terminates.

In block 606, three users are selected from the four users $N_a$, $N_b$, $N_c$ and $N_d$, where a circle generated from the three users selected and covers the four users is a circle with a minimum radius. Then the three users selected are taken as new users $N_a$, $N_b$, and $N_c$ and return to block 602.

After all the hovering positions of all wireless multicast user groups are determined, the UAV need to fly through all the hovering positions in sequence and transmit the one or more files at each of the hovering positions. In order to reduce the flying energy consumption of the UAV while flying among the hovering positions, a shortest flying path of the UAV that starts from a start position, passes through all the hovering positions and returns to the start position needs to be found. This problem is equivalent to a well-known travel seller problem and can be solved by one of the following methods: the genetic algorithm, the particle swarm algorithm, the ant colony algorithm, the simulated annealing algorithm and the neural network algorithm.

Figure 7:
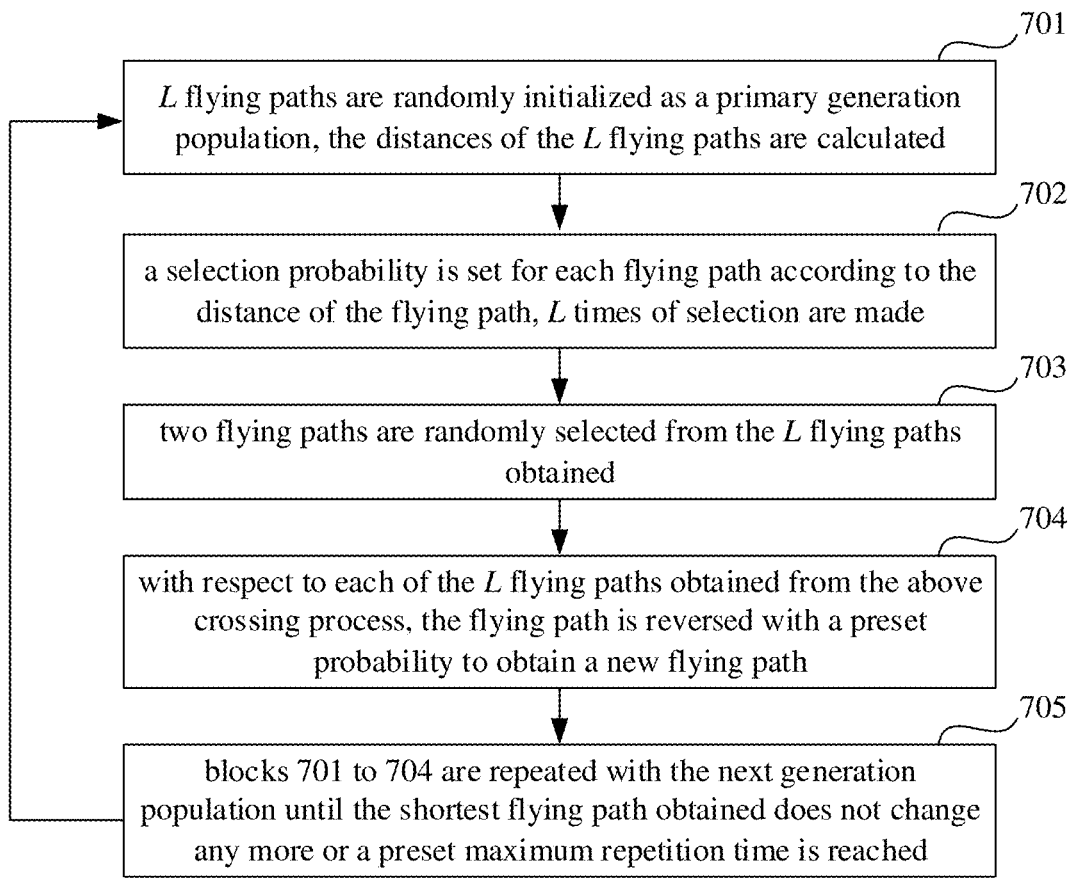
FIG. 7 is a flow chart illustrating a method for determining a shortest flying path through a genetic algorithm according to some examples of the present disclosure.

FIG. 7 is a flow chart illustrating a method for determining a shortest flying path through a genetic algorithm according to some examples of the present disclosure.

According to FIG. 7, the method may include the following steps.

In block 701, L flying paths are randomly initialized as a primary generation population.

In this block, the distances of the L flying paths are calculated. The L flying paths are sequenced according to the distances of the L flying paths.

In block 702, according to the roulette wheel gambling strategy, a selection probability is set for each flying path according to the distance of the flying path. Wherein, the shorter the distance of the flying path is, the greater the selection probability of the flying path is. Then, L times of selection are made, wherein in each selection, one flying path is selected from the L flying paths. After L times of selection, L flying paths are selected. Then, proceed to block 703.

In block 703, two flying paths are randomly selected from the L flying paths obtained from block 702. Then the two flying paths are crossed with a preset probability to obtain two new flying paths. The two flying paths selected are replaced by the two new flying paths. This block is repeated until all the L paths are selected. To be noted, in this procedure, repeated selection should be avoided.

In block 704, with respect to each of the L flying paths obtained from the above crossing process, the flying path is reversed with a preset probability to obtain a new flying path. Then the previous lying path is replaced by the new flying path. This block is then repeated until all the L flying paths are selected. To be noted, in this procedure, repeated selection should be avoided. Then, the L flying paths obtained would be taken as a next generation population.

In block 705, blocks 701 to 704 are repeated with the next generation population until the shortest flying path obtained does not change any more or a preset maximum repetition time is reached.

In summary, after the initial flying path is determined, the total energy consumption of the UAV while performing the transmission task is shown in the following formula (4).

$$E = E_f + E_h + E_t = P_f \frac{\sum_{k \in K} \|u_k - u_{k-1}\|}{V} + (P_h + P_t) \sum_{k \in K} \frac{S}{B \log_2\left(1 + \min_{n \in N_k} \frac{P_t \beta_0}{\sigma^2 \|u_k - w_n\|_2^2}\right)}, u_0 = u_K \quad (4)$$

When determining the hovering positions, only the mechanical energy consumption of the UAV while hovering and the communication energy consumption during data transmission are taken into consideration, and the length of flying path passing through all the hovering positions is not taken into consideration. In this case, the flying energy consumption of the UAV may still be large. Therefore, further optimization needs to be carried out on the hovering positions corresponding to the wireless multicast user groups.

The optimization problem of one hovering position assuming the other hovering positions are fixed can be expressed as the following expression (5) according to the formula of total energy E.

$$\min_{u_k} \left[ P_f \left( \frac{\|u_{k+1} - u_k\|}{V} + \frac{\|u_k - u_{k-1}\|}{V} \right) + (P_h + P_t) \frac{S}{\min_{w_n \in N_k} B \log_2\left(1 + \frac{P_t \beta_0}{\sigma^2 (\|u_k - w_n\|_2^2 + H^2)}\right)} \right] + Q_k \quad (5)$$

Wherein, $Q_k$ represents the total energy consumed by the UAV in other K-1 wireless multicast user groups.

In one or more examples of the present disclosure, an auxiliary variable $$\eta = \min_{n \in N_k} B \log_2\left(1 + \frac{P_t \beta_0}{\sigma^2 (\|u_k - w_n\|_2^2 + H^2)}\right)$$

is introduced.

In this case, the optimization problem may be expressed as:

$$\min_{u_k} \left[ P_f \left( \frac{\|u_{k+1} - u_k\|}{V} + \frac{\|u_k - u_{k-1}\|}{V} \right) + (P_h + P_t) \frac{S}{\eta} \right] + Q_k$$

$$\text{st. } \|u_k - w_n\|_2^2 \leq \frac{P_t \beta_0}{\sigma^2 \left(2^{\frac{\eta}{B}} - 1\right)} - H^2, \forall n \in N_k$$

This is a non-linear optimization problem, and algorithms for solving the non-linear optimization, such as the interior point method, may be used to optimize this hovering position. Similarly, the remaining hovering positions can be optimized in turn.

When all hovering positions are optimized, a shortest flying path passing through the new hovering positions needs to be found again according to the previous method (any one of the genetic algorithms, the particle swarm algorithm, the ant colony algorithm, the simulated annealing algorithm and the neural network algorithm). Due to the fact that the new hovering positions are changed compared with the initial hovering positions. Then the total energy consumption of the UAV for completing the transmission task under the new hovering positions and the new flying path is obtained. On condition that the absolute value of the difference between the new energy consumption and the previous energy consumption is smaller than a set threshold, the algorithm is terminated. Otherwise, a new round of optimization should be carried out until the result converges.

According to one or more examples of the present disclosure, in the method of path optimization for a UAV proposed, the number and the geographic distribution of users are fully considered. In this method, the users are adaptively divided into a plurality of wireless multicast user groups through a data-driven method and an appropriate hovering position is found for each wireless multicast user group. Therefore, the UAV can transmit one or more files at the hovering positions with a higher transmission rate. By this way, the purpose of reducing the hovering energy consumption and the transmission energy consumption of the UAV can be achieved. Moreover, in this method, the flying path of the UAV is designed to find a shortest flying path which starts from a start position, passes through all the hovering positions and then returns to the start position. By this way, the flying energy consumption of the UAV can be reduced. It can be seen that the method can balance both the mechanical energy consumption and the communication energy consumption of the UAV so as to complete the transmission task with a minimum total energy consumption.

By designing the flying path of the UAV, the energy of the UAV can be utilized more efficiently and the multicast transmission efficiency can be remarkably improved.

According to one or more examples of the present disclosure, in the method of path optimization for a UAV proposed, the users are divided into a plurality of wireless multicast user groups adaptively, so that the UAV can select an appropriate transmission mode according to a specific scenario, and the time and energy spent by the UAV for executing the transmitting tasks can be greatly reduced.

According to one or more examples of the present disclosure, in the method of path optimization for a UAV proposed, an SVM model is trained. The trained SVM model may predict the appropriate number of wireless multicast user groups according to the number of users, the geographic positions of the users and the size of one or more files to be transmitted. By this SVM model, the calculation complexity is reduced.

According to the above method, a data driving method is used for modeling, therefore, accurate prediction on the number of the wireless multicast user groups can be output in real time by the model. Moreover, the efficiency of determining the number of the wireless multicast user groups can be greatly improved, and the practicability of the method is extremely high.

Figure 8:
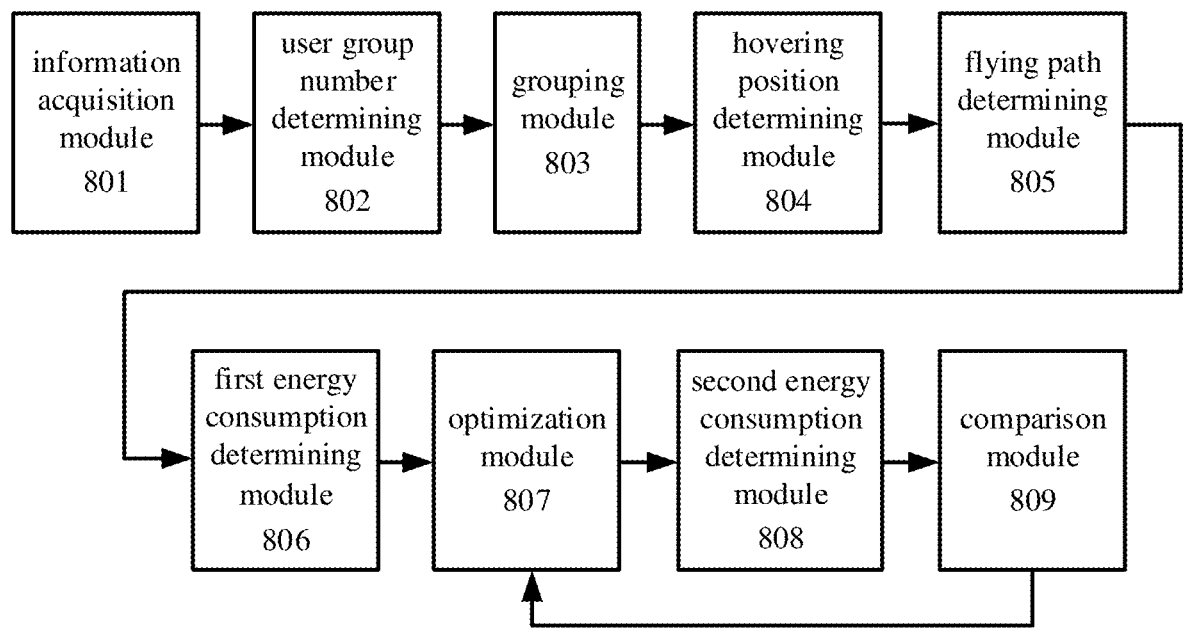
FIG. 8 is a schematic diagram illustrating the structure of a device of path optimization for a UAV according to some examples of the present disclosure.

Corresponding to the method of path optimization for a UAV, some other examples of the present disclosure also provide a device of path optimizing for a UAV. FIG. 8 is a schematic diagram illustrating the structure of a device of path optimization for a UAV according to some examples of the present disclosure. According to FIG. 8, the device of path optimization for a UAV may include the following parts.

An information acquisition module 801 is to obtain the number of users, the geographic position of each user and the size of one or more files to be transmitted.

A user group number determining module 802 is to determine the number of wireless multicast user groups according to the number of users, the geographic position of each user and the size of the one or more files to be transmitted.

A grouping module 803 is to divide the users into a plurality of wireless multicast user groups according to the number of the wireless multicast user groups determined.

A hovering position determining module 804 is to determine a hovering position of the UAV corresponding to each wireless multicast user group.

A flying path determining module 805 is to determining a shortest flying path connecting each hovering position of the UAV corresponding to each wireless multicast user group.

A first energy consumption determining module 806 is to determine a first total energy consumption of the UAV according to the size of the one or more files to be transmitted, the hovering positions and the shortest flying path of the UAV.

An optimization module 807 is to optimize the hovering positions one by one to obtain a plurality of optimized hovering positions, and determine a second shortest flying path connecting the plurality of optimized hovering positions.

A second energy consumption determining module 808 is to determine a second total energy consumption of the UAV according to the size of the one or more files to be transmitted, the optimized hovering positions and the second shortest flying path.

A comparison module 809 is to compare the first total energy consumption with the second total energy consumption. On condition that the absolute value of the difference between the first total energy consumption and the second total energy consumption is larger than a preset threshold, the optimization module 807 is activated to perform a next round optimization on the basis of the current result of optimization. On condition that the absolute value of the difference is less than or equal to the preset threshold, the optimized hovering positions are determined as the hovering positions of the UAV and the second shortest flying path is determined as the flying path of the UAV.

According to some examples of the present disclosure, the user group number determining module 802 described above may determine the number of wireless multicast user groups through the method illustrated in FIG. 5. The hovering position determining module 804 may determine the hovering position of the UAV for each wireless multicast user group through the method illustrated in FIG. 6. The flying path determining module 805 may determine the first shortest flying path using the method illustrated in the FIG. 7. The grouping module 803, the first energy consumption determining module 806, the optimizing module 807, the second energy consumption determining module 808, and the comparing module 809 may also be implemented using the specific methods described above in the method of path optimization for a UAV. Therefore, no further description will be given again.

Figure 9:
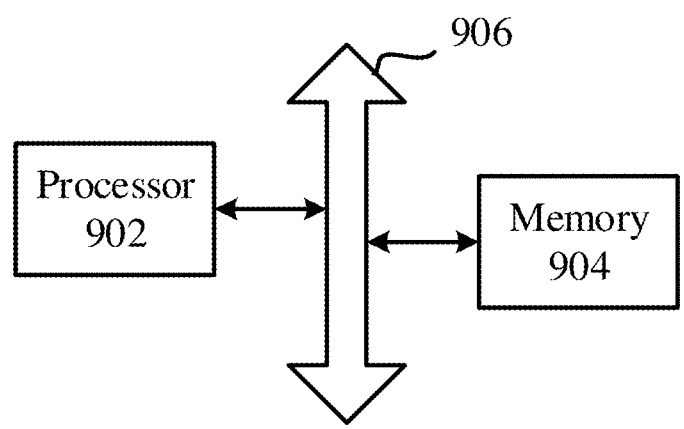
FIG. 9 is a schematic diagram illustrating the hardware structure of a device of path optimization for a UAV according to some examples of the present disclosure.

FIG. 9 is a schematic diagram illustrating the hardware structure of a device of path optimization for a UAV according to some examples of the present disclosure. As shown in FIG. 9, the device of path optimization for the UAV may include: at least one processor 902 and a memory 904 coupled with the at least one processor. The memory 904 is to store instructions executable by the at least one processor 902 to enable the at least one processor to perform any of the methods described above.

The device may further include an input device and an output device. The at least one processor, the memory, the input device, and the output device may be connected through a bus or other means. The memory, as a non-volatile computer readable storage medium, may be used to store non-volatile software programs, non-volatile computer executable programs, and modules, such as program instructions/modules corresponding to the method of as described in examples of the present disclosure. The at least one processor executes various functional applications and data processing of the server by running non-volatile software programs, instructions, and modules stored in memory, i.e. implements the above method of path optimization for the UAV.

The memory may include a memory program area and a memory data area. Wherein the memory program area may store an operating system and an application program required for at least one function. The storage data area may store data or the like created according to the use of the computer migration apparatus of the program. In addition, the memory may include high-speed random-access memory, and may also include non-volatile memory, such as at least one magnetic disk storage device, flash memory device, or other non-volatile solid-state storage device. In some examples, the memory may optionally include memory remotely located with respect to the processor. Examples of such networks include, but are not limited to, the Internet, an intranet, a local area network, a mobile communication network, and combinations thereof.

The input device may receive input numeric or character information and generate key signal inputs related to user settings and function control of the device. The output means may comprise a display device such as a display screen. The one or more modules are stored in the memory and, when executed by the processor, perform the any of the method described above. Any one of the examples of the device executing the method of path optimization may achieve the same or similar effects as any of the aforementioned methods corresponding thereto.

It will be appreciated by those of ordinary skilled in the art that the implementation of all or part of the flow of the methods of the examples described above can be accomplished by a computer program that can be stored in a computer readable storage medium and that, when executed, can include the flow of the examples of the methods described above. The storage medium may be a magnetic disk, an optical disk, a Read-Only Memory (ROM) or a Random-Access Memory (RAM), etc. Examples of the computer program may achieve the same or similar results as any of the methods described above.

In addition, the method may be implemented as a computer program executed by CPU or GPU. The computer program can be stored in a non-volatile computer readable storage medium. When the computer program is executed by CPU or GPU, the function disclosed by the above method may be executed. Moreover, the above-described method and device may also be implemented with a controller and a computer-readable storage medium storing a computer program that causes the controller to perform the functions of the above-described method or device. One ordinary skilled in the art will appreciate that the discussion of any of the above examples is merely exemplary and is not intended to imply that the scope of the disclosure, including the claims, is limited to these examples. The above examples or technical features in different examples may also be combined under the idea of the present disclosure. The steps may be implemented in any order. There are many other variations of different aspects of the disclosure as described above, which are not provided in detail for the sake of brevity.

The present examples are intended to embrace all such alternatives, modifications and variances that fall within the broad scope of the appended claims. Therefore, it is intended that any omissions, modifications, equivalents, improvements and the like be included within the spirit and scope of the present disclosure.

In addition, well-known power/ground connections to integrated circuit (IC) chips and other components may or may not be shown in the figures provided for simplicity of illustration and discussion and to not obscure the present disclosure. Furthermore, means may be shown in block diagram form in order to avoid obscuring the disclosure, and this also takes into account the fact that details regarding implementations of such block diagram means are highly dependent on the platform in which the disclosure is to be implemented (i.e., such details should be well within the purview of one skilled in the art). While specific details (e.g., circuits) have been set forth in order to describe exemplary examples of the application, it will be apparent to those skilled in the art that the application may be practiced without these specific details or with variations of these specific details. Accordingly, the description is to be regarded as illustrative in nature, and not as restrictive.

While the disclosure has been described in conjunction with specific examples thereof, many alternatives, modifications and variations thereof will be apparent to those skilled in the art in light of the foregoing description. For example, other memory architectures (e.g., dynamic RAM (DRAM)) may use the examples discussed.

What is claimed is:

1. A method of path optimization for an unmanned aerial vehicle (UAV), comprising:
   determining a number of wireless multicast user groups according to a number of users, a position of each user and a size of one or more files to be transmitted;
   dividing the users into a plurality of wireless multicast user groups according to the number of the wireless multicast user groups determined;
   determining a hovering position of the UAV corresponding to each wireless multicast user group;
   determining a first shortest flying path connecting all hovering positions of the UAV;
   determining a first total energy consumption of the UAV according to the size of the one or more files to be transmitted, the hovering positions of the UAV and the first shortest flying path of the UAV;
   optimizing the hovering positions of the UAV one by one to obtain a plurality of optimized hovering positions;
   determining a second shortest flying path connecting the plurality of optimized hovering positions;
   determining a second total energy consumption of the UAV according to the size of the one or more files to be transmitted, the optimized hovering positions of the UAV and the second shortest flying path;
   comparing the first total energy consumption with the second total energy consumption;
   on condition that the absolute value of the difference between the first total energy consumption and the second total energy consumption is larger than a preset threshold, returning to the step of optimizing the hovering positions of the UAV one by one to carry out a next round of optimization; and
   on condition that the absolute value of the difference is less than or equal to the preset threshold, determining the optimized hovering positions as the hovering positions of the UAV and determining the second shortest flying path as the flying path of the UAV.

2. The method of claim 1, wherein determining the number of wireless multicast user groups comprises:
   determining the number of the wireless multicast user groups by a trained support vector machine, SVM, model according to the number of users, the position of each user and the size of one or more files to be transmitted.

3. The method of claim 2, wherein determining the number of the wireless multicast user groups comprises:
   determining possible values of the number of the wireless multicast user groups $K^*$ according to the number of users N;
   with respect to each possible value of the number of the wireless multicast user groups $K^*$, dividing the users into $K^*$ wireless multicast user groups through the k-means algorithm and calculating an average silhouette coefficient $\lambda^*$ corresponding to the number of the wireless multicast user groups $K^*$;
   inputting the number of users N, the size of the one or more files to be transmitted S, the possible value of the number of the wireless multicast user groups $K^*$ and the corresponding average silhouette coefficient $\lambda^*$ into the trained SVM model to obtain a predicted total energy consumption $E_K^*$ corresponding to the possible value of the number of the wireless multicast user groups $K^*$; and
   taking the possible value of the number of the wireless multicast user groups $K^*$ corresponding to the minimum predicted total energy consumption $E_K^*$ as the number of the wireless multicast user groups.

4. The method of claim 2, wherein the SVM model is trained by a method which comprises:
   generating X groups of training data by simulation, wherein each group of training data comprises the number of users, the geographic positions of the users, the size of one or more files to be transmitted and the number of wireless multicast user groups K;

calculating an average silhouette coefficient of according to the number of users, the geographic positions of the users and the number of wireless multicast user groups K;

determining a final total energy consumption corresponding to each group of training data according to the number of users, the geographic positions of the users, the size of one or more files to be transmitted and the number of wireless multicast user groups K;

determining X groups of first data, wherein each group of first data comprises the number of users, the number of wireless multicast user groups K, the size of one or more files to be transmitted and the average silhouette coefficient;

determining X groups of second data each of which corresponds to a group of first data, wherein, each group of second data comprises the final total energy consumption corresponding to a group of first data; and training an SVM model by taking the X groups of first data as inputs of the SVM model and taking the X groups of second data as output of the SVM model.

5. The method of claim 4, wherein determining the final total energy consumption corresponding to each group of training data comprises:

dividing the users in each group of training data into K wireless multicast user groups;

determining K hovering positions corresponding to the K wireless multicast user groups and a first shortest flying path connecting the K hovering positions;

determining a first total energy consumption of the UAV according to the size of the one or more files to be transmitted, the hovering positions and the first shortest flying path of the UAV;

optimizing the hovering positions and the first shortest flying path to obtain final hovering positions, a final flying path; and determining a final total energy consumption corresponding to the final hovering positions and the final flying path.

6. The method of claim 1, wherein dividing the users into a plurality of wireless multicast user groups comprises:

dividing the users into a plurality of wireless multicast user groups through the k-means algorithm.

7. The method of claim 1, wherein determining a hovering position of the UAV corresponding to each wireless multicast user group comprises:

determining the hovering position of the UAV corresponding to each wireless multicast user group through the minimum circle coverage method.

8. The method of claim 7, wherein determining the hovering position of the UAV corresponding to each wireless multicast user group through the minimum circle coverage method comprises:

selecting three users $N_a$, $N_b$, $N_c$ from the users in the wireless multicast user group;

generating a minimum circle covering the three users $N_a$, $N_b$, $N_c$;

finding a user $N_d$ with the longest distance from the center of the minimum circle among the other wireless multicast users of the wireless multicast user group;

on condition that the user $N_d$ is inside or on the minimum circle, determining the center of the minimum circle as the hovering position corresponding to the wireless multicast user group; and on condition that the user $N_d$ is outside the minimum circle, selecting three users from the four users $N_a$, $N_b$, $N_c$ and $N_d$ where a circle generated from the three users selected that covers the four users is a circle with a minimum radius; taking the three users selected as new users $N_a$, $N_b$, and $N_c$ and returning to the step of generating a minimum circle covering the three users $N_a$, $N_b$, $N_c$.

9. The method of claim 1, wherein determining a first shortest flying path connecting all hovering positions of the UAV comprises:

determining the first shortest flying path connecting all hovering positions of the UAV by any one of the genetic algorithm, the particle swarm algorithm, the ant colony algorithm, the simulated annealing algorithm or the neural network algorithm.

10. The method of claim 1, wherein determining a second shortest flying path connecting the plurality of optimized hovering positions comprises: determining the second shortest flying path connecting the plurality of optimized hovering positions by any one of the genetic algorithm, the particle swarm algorithm, the ant colony algorithm, the simulated annealing algorithm or the neural network algorithm.

11. The method of claim 9, wherein determining the first shortest flying path connecting all hovering positions of the UAV by the genetic algorithm comprises:

initializing L flying paths as a primary generation population;

calculating the distances of the L flying paths;

sequencing the L flying paths according to the distances of the L flying paths;

setting a selection probability for each flying path according to the distance of the flying path; wherein, the shorter the distance of the flying path is, the greater the selection probability of the flying path is;

making L times of selection to obtain L flying paths, wherein in each selection, one flying path is selected from the L flying paths;

selecting two flying paths from the L flying paths obtained;

crossing the two flying paths with a preset probability to obtain two new flying paths to replace the previous flying paths and repeating this step until all the L paths are selected;

with respect to each of the L flying paths obtained from the above crossing process, reversing the flying path by a preset probability to obtain a new flying path, replacing the previous lying path with the new flying path and repeating this step until all the L paths are selected;

taking the L flying paths as a next generation population; and repeating the step of initializing L flying paths as a primary generation population to the step of taking the L flying paths as a next generation population with the next generation population until the shortest flying path obtained does not change or a preset maximum repetition time is reached.

12. The method of claim 1, wherein determining a first shortest flying path connecting all hovering positions of the UAV comprises:

determining the time required for file transmission and the transmitting power of the UAV according to the size of the one or more file to be transmitted and the hovering positions;

determining a communication energy consumption and a hovering energy consumption of the UAV according to the time required for the file transmission and the transmitting power of the UAV;

determining a flying energy consumption of the UAV according to the first shortest flying path; and determining the first total energy consumption of the UAV according to the communication energy consumption, the hovering energy consumption and the flying energy consumption determined.

13. The method of claim 1, wherein optimizing the hovering positions of the UAV one by one to obtain a plurality of optimized hovering positions comprises:

optimizing the hovering positions one by one through the interior point method.

14. The method of claim 1, further comprising:

before optimizing the hovering positions of the UAV one by one to carry out a next round of optimization, taking the optimized hovering positions as hovering positions before being optimized and taking the second total energy consumption as the first total energy consumption.

15. A device of path optimization for an unmanned aerial vehicle, UAV, comprising:

at least one processor; and a memory coupled with the at least one processor; wherein, the memory stores one or more instructions executable by the at least one processor to enable the at least one processor to perform the method of claim 1.

16. A non-transitory computer-readable storage medium, comprising one or more instructions, when executed by one or more processors, enables the one or more processors to perform the method according to claim 1.

* * * * *